United States Patent
Hamada

(10) Patent No.: US 6,744,459 B2
(45) Date of Patent: Jun. 1, 2004

(54) IMAGE FORMING APPARATUS USING A SINGLE OPTICAL FIBER TO TRANSMIT ELECTRICAL SIGNALS

(75) Inventor: Takatoshi Hamada, Osaka (JP)

(73) Assignee: Minolta Co., Ltd., Osaka (JP)

( * ) Notice: Subject to any disclaimer, the term of this patent is extended or adjusted under 35 U.S.C. 154(b) by 52 days.

(21) Appl. No.: 10/000,481

(22) Filed: Dec. 4, 2001

(65) Prior Publication Data

US 2002/0071165 A1 Jun. 13, 2002

(30) Foreign Application Priority Data

Dec. 11, 2000 (JP) ......................................... 2000-376640

(51) Int. Cl.[7] ............................... B41J 2/435; B41J 2/47
(52) U.S. Cl. ........................................ 347/250; 347/235
(58) Field of Search ................................ 347/234, 235, 347/248, 250, 246, 236; 250/336; 369/53.28; 358/412, 480

(56) References Cited

U.S. PATENT DOCUMENTS 4,675,741 A * 6/1987 Shinohara .................... 358/480
5,371,608 A * 12/1994 Muto et al. ................... 358/412
5,838,001 A * 11/1998 Minakuchi et al. ......... 250/236
6,584,052 B1 * 6/2003 Phillips et al. ............ 369/53.28

FOREIGN PATENT DOCUMENTS

| JP | 05-221013 | 8/1993 |
| JP | 08-106039 | 4/1996 |
| JP | 09-277588 | 10/1997 |
| JP | 11-042814 | 2/1999 |
| JP | 2000-249944 | 9/2000 |

* cited by examiner

Primary Examiner—Hai Pham
(74) Attorney, Agent, or Firm—Morrison & Foerster LLP

(57) ABSTRACT

An image forming apparatus is provided which not only transmits optical signals of image information and optical signal for synchronizing from the video controller to the print engine using a single optical fiber and without using a special synchronization optical fiber, but also transmits a synchronizing optical signal reflected by the SOS mirror on the print engine side simultaneously in the reverse path to the video controller, such that the number of lines are reduced in the layout, external noise and emitted noise are reduced, and the interior of the image forming apparatus is consolidated making handling and assembly easier. The apparatus transmits optical signals over an optical fiber, scans a photosensitive drum via a beam emitted from the optical fiber and detects the beam at a detection position disposed outside the image region, and synchronizes the main scan direction based on the detected beam.

12 Claims, 9 Drawing Sheets

IMAGE FORMING APPARATUS USING A SINGLE OPTICAL FIBER TO TRANSMIT ELECTRICAL SIGNALS

RELATED APPLICATIONS

This application is based on application No. 00-0376640 filed in Japan, the contents of which are hereby incorporated by reference.

FIELD OF THE INVENTION

The present invention relates to the field of art of image forming apparatuses such as copiers, printers and the like, relates to a high-speed, high-precision image forming apparatus producing very slight radiation noise and which is not susceptible to external noise, and further relates to an image forming apparatus of the type which transmits image signals by optical fiber.

DESCRIPTION OF THE RELATED ART

The housing of an image forming apparatus such as a digital copier, laser printer and the like accommodates various types of structural elements including parts (print engine) directly related to actually forming a visible image such as photosensitive drum, laser oscillator, polygonal mirror, laser driver and the like, devices for receiving electrical signals for forming an image from external devices (or scanner), paper supply device, and various controllers for controlling these elements.

These structural elements cannot be freely arranged since the size of the housing itself is limited to achieve a compact form-factor similar to other office equipment. For this reason the elements which must be mutually separated for whatever reason are connected by cables used to transmit electrical signals.

Since the electrical signals transmitted over these cables include not only the high fundamental frequency of the signal itself which transmits much information, but also includes a large amount of the high-frequency component of digital signals, and when the cable is long, strong electromagnetic waves (noise) are emitted from the cable such that this noise itself as well as noise from other office equipment may cause operation errors.

A long cable may cause misshaping of the waveform of the signals transmitted over the cable, such that the signals may be recognized as errors on the receiving side so as to cause operation errors. Furthermore, there is concern that a long cable may function as an antenna collecting noise from outside the housing as well as inside the housing, so as to cause operation error in the apparatus.

Although these problems can be eliminated by providing shielding for the housing as well as between elements, shielding produces other problems by not only increasing the weight and volume of the apparatus and adversely affecting thermal efficiency, but also increasing the maintenance load, and increasing the cost of the apparatus.

The cables electrically connecting the print engine and video controller in image forming apparatuses are often relatively long due to the layout restrictions. Furthermore, since these cables carry the information of each pixel of an image across the entire image, they must transmit an extremely huge quantity of data having a high fundamental frequency which easily produces the previously described problems.

In the field of image forming apparatuses, on the other hand, there is strong demand for higher-speed image formation. In response to this demand much effort has been expended to increase the laser beam scanning speed, but as a result we must wait for solutions to problems of peripheral art including improving laser responsiveness, improving (accelerating) scanning signal generation speed, increasing the rotation speed of the polygonal mirror and the like.

This improvement does not pertain to simple improvement of scanning speed using a single laser beam as used heretofore, but pertains to simultaneous scanning by a plurality of laser beams (multi-beam scanning method). The multi-beam scanning method uses a plurality of laser beam light sources, wherein the laser beams emitted from the light sources simultaneously scan the surface of a photosensitive drum via an optical deflecting means such as a single polygonal mirror or the like.

Such a method is advantageous in that image formation can be accomplished as a speed of a multiple corresponding to the number of laser light sources with the previously described current art as is.

In this case, normally, a plurality of laser diodes are used, and the laser beam from each laser diode provided to a video controller is directed to a polygonal mirror of the print engine by a respective optical fiber.

Since electrical signals are not used in the signal transfers between the print engine and video controller as previously described, stable operation can be expected and image forming speed can be improved by using, for example, optical fiber within the housing, so as to not receive electrical noise from outside the housing even though there are electrical noise generation sources outside the housing.

Since the optical fibers discussed above used within the housing accommodate only several laser beams (or tens of beams in some cases), the thickness of the entire bundle of optical fibers cannot be ignored, and problems arise in the complexity of the task of handling and assembling these optical fibers. This method cannot be said to be adequate because the synchronizing signal is light reflected by an SOS mirror on the print engine side which is received by an SOS sensor, and the received light signal is electrically transmitted to the print engine side and may be affected by external noise from the electrical line used for this transmission, or this electrical line may emit noise. Furthermore, as for the signal used for synchronization there is no difference using the electrical signal line, and the task remains of handling and assembling this line.

SUMMARY OF THE INVENTION

In regard to the previously described problems there is no difference in using the line within the housing when one considers the signal line used for synchronization as a separate optical fiber. The present invention does not use a separate optical fiber, i.e., does not use a special optical fiber, and not only transmits signals including image information and synchronizing signals (radiation light for obtaining synchronizing signal) using a single optical fiber, but also transmits a synchronizing signal reflected by the SOS mirror on the print engine side simultaneously over a reverse path to the video controller. Furthermore, the present invention provides an image forming apparatus capable of reducing the number of lines (electrical signal lines and optical fiber) used in the housing, reducing external noise and emitted noise, and the interior of the image forming apparatus is consolidated making handling and assembly easier.

According to one embodiment, the present invention provides an image forming apparatus provided with a transmission means for sending optical signals over optical fiber, and an optical scanning device for scanning an object using an optical beam emitted from the optical fiber and detecting the optical beam at a detection position provided outside the image region, and synchronizing the main scan direction based on the detected beam, wherein the synchronizing optical output detected at the detection position is subjected to wavelength conversion by a wavelength converting means, and bi-directional communication is accomplished using the same optical fiber transmitting the optical signals.

A second solution means of the present invention provides an image forming apparatus provided with a transmission means for sending optical signals over optical fiber, a synchronizing optical output means for synchronization, wherein the wavelength of the synchronizing optical output is different from the wavelength of the optical signal transmitted by the transmission means, and an optical scanning device for scanning an object using an optical beam emitted from the optical fiber, and detecting the optical beam emitted by the synchronizing optical output means at a detection position provided outside the image region, and synchronizing the main scan direction based on the detected beam, wherein bi-directional communication is accomplished over the same optical fiber transmitting the optical signals by the transmission means and the synchronizing optical output at the detection position.

DESCRIPTION OF THE PREFERRED EMBODIMENTS

The preferred embodiments of the present invention are described hereinafter. Heretofore, the conventional examples have been described in terms of the multi-beam scanning method using a single optical fiber to transmit image information from a video controller to a print engine, however, the present invention as described in the embodiments below transmits both image signals from the video controller side to the print engine side and optical signals for synchronization in the opposite direction from the print engine side to the video controller side over the same optical fiber. For this reason the present invention is applicable to both multi-beam scanning methods and single beam scanning methods, and does not particularly distinguish between the two.

First Embodiment

Figure 1:
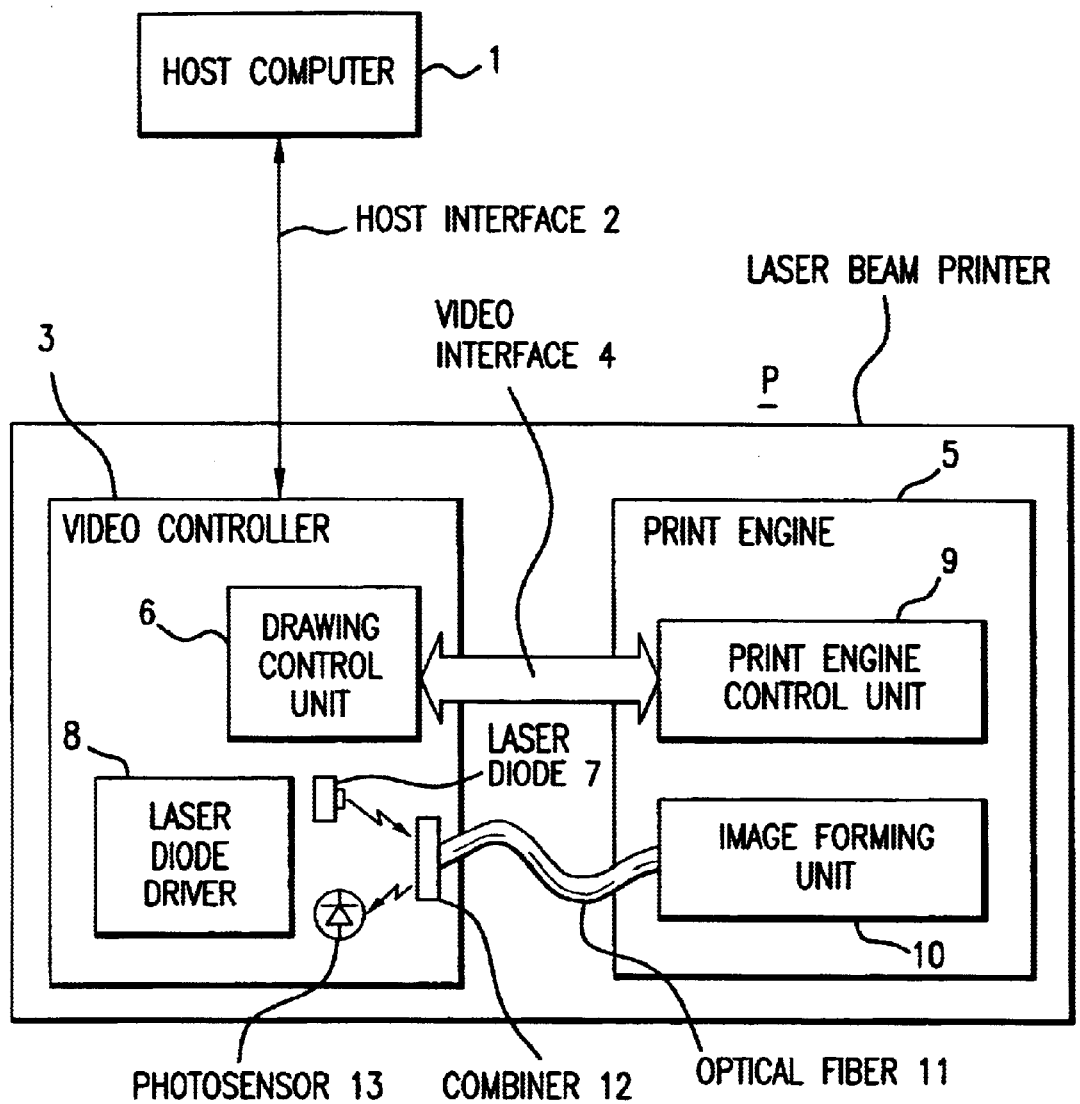
FIG. 1 is a block diagram briefly showing the structure of a laser beam printer of an embodiment of the image forming apparatus of the present invention, and is common to both the first embodiment and the second embodiment.

FIG. 1 is a block diagram briefly showing the structure of a laser beam printer of the image forming apparatus of this embodiment of the present invention, and FIG. 1 is common to both the first embodiment and a second embodiment described later. In FIG. 1, a laser beam printer P is connected to a host controller, i.e., host computer 1, via a host interface 2. The laser beam printer P is provided with a video controller 3, and a print engine 5, and the video controller 3 is connected to the host computer 1 via the host interface 2.

The video controller 3 is provided with a drawing control unit 6, laser diode driver 8 (single or multiple), and semiconductor laser, e.g., laser diode 7 (single or multiple), and the video controller 3 receives image information (this image information includes in addition to print data, codes for setting format control and print mode) from the host computer 1, and the print engine 5 described later converts the received image information to image formation data (bitmap data, raster data) for actually recording on a transfer sheet. Raster data are converted to a light beam (in the case of a plurality of beams, the beams will have different wavelengths) by the laser diode 7 driven by the diode driver 8, the beams are combined in a combiner 12, and introduced into an optical fiber 11. The video controller 3 is provided with a photosensor 13 (single or multiple), and this photosensor 13 receives the synchronizing signal output from the optical fiber 11.

Figure 2:
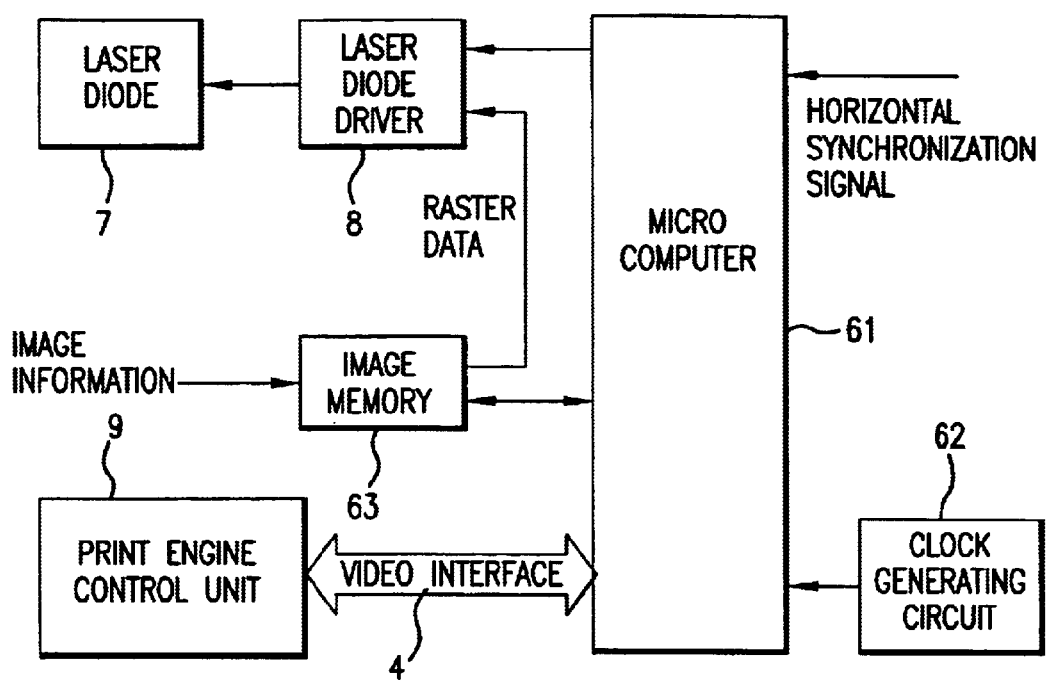
FIG. 2 is common to both the first embodiment and the second embodiment and is an example of a block diagram showing more details of the drawing control unit 6 and part of the elements connected thereto.

The print engine 5 is provided with a print engine control unit 9, and an image forming unit 10. The print engine control unit 9 is connected to a drawing control unit 6 via a video interface 4, and is controlled by the drawing control unit 6. FIG. 2 is a common drawing pertaining to the first and second embodiments, and shows an example of a block diagram showing more details of the drawing control unit 6, and of part of the essential elements connected thereto.

The drawing control unit 6 is provided with a microcomputer 61, image memory 63, and clock generating circuit 62. Print data such as text transmitted in ASCII code or the like are converted to dot ON/OFF information, i.e., raster data, for each one line using the image memory 63, and horizontally synchronizing light transmitted from the print engine 5 is combined by the combiner 12, input to the photosensor 13, and input to the microcomputer 61 as an electrical signal after photoelectric conversion in the photosensor 13. The electrical signal input to the microcomputer 61 drives the laser diode driver 8 in accordance with the raster data of each single scan (see FIG. 2).

The drawing control unit 6 decodes print mode and print format setting data other than the print data, and transmits control signals to the print engine via the video interface 4 for execution. In this way the drawing control unit 6 sends and receives various types of data and signals between the video controller 3 and the print engine 5, and included among these signals are also signals permitting light emission by the laser diode 7 transmitted from the print engine 5.

The print engine 5 executes an electrophotographic process on the transfer sheet M (FIG. 4) based on information transmitted from the video controller 3, and records the image. The print engine 5 is provided with a print engine controller 9 for receiving signals from the drawing control unit 6, and an image forming unit 10 (FIG. 4) for executing processing for scanning optical signals from the laser diode 7 on the photosensitive layer 22 of a photosensitive drum 21 (FIG. 4) described later so as to form a latent image, and develop, transfer, and fix the image.

Figure 3:
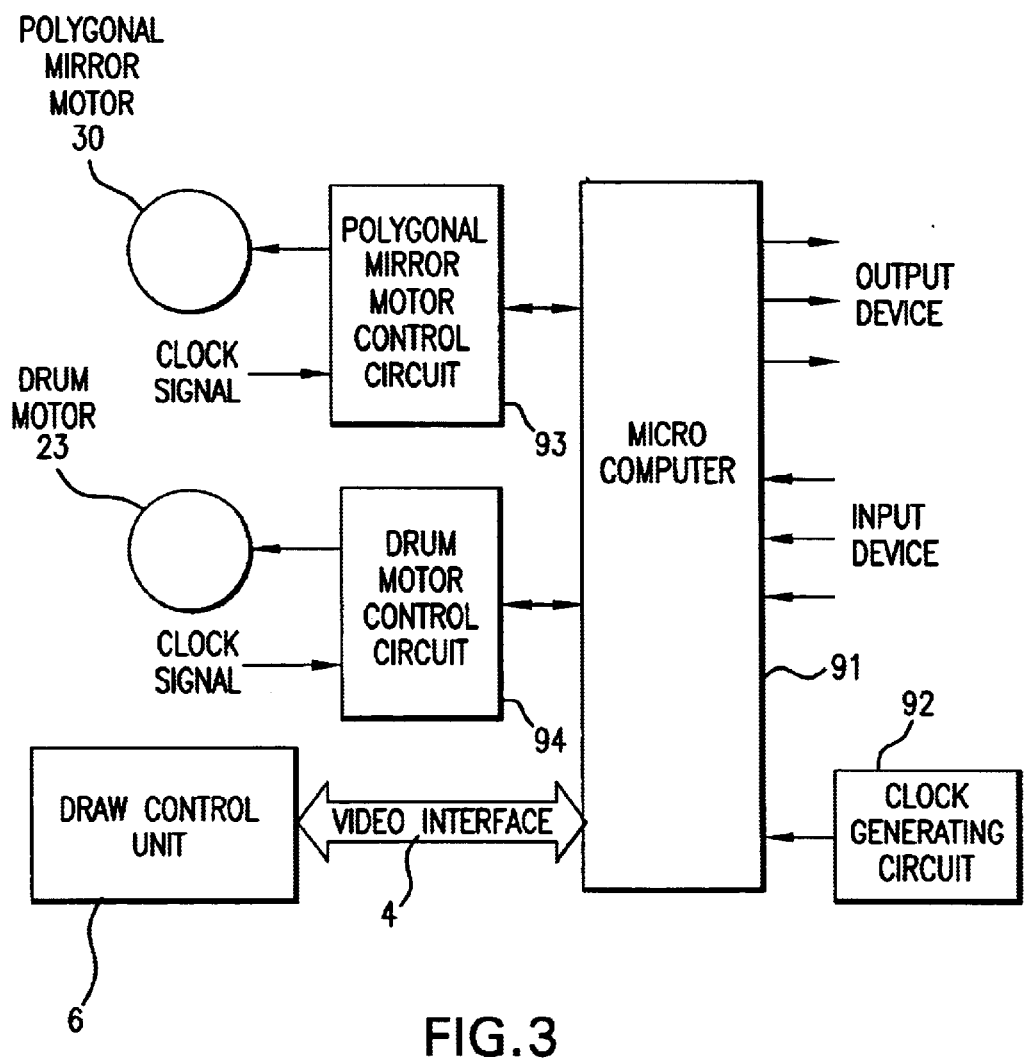
FIG. 3 is an example of a block diagram showing more details of the print engine control unit 9 of the first embodiment and part of the elements connected thereto.

After the output light from the laser diode 7 is combined by the combiner 12, it is optical linked to the image forming unit 10 by the optical fiber 11. FIG. 3 is an example of a block diagram showing more details of the print engine control unit 9 of the first embodiment and part of the elements connected thereto.

The print engine control unit 9 is provided with a microcomputer 91, clock generating circuit 92 driving the microcomputer 91, polygonal mirror motor control circuit 93, and drum motor control circuit 94. In the print engine control unit 9, when the video controller 3 completes analysis of the image information and a print execution command is transmitted, the standby state of the print engine 5 is verified, and thereafter a signal permitting the emission operation of the laser diode 7 is transmitted to the video controller 3, and in this way the execution of the electrophotographic process is started.

Specifically, the microcomputer 91 drives the polygonal mirror motor 30 described later via the polygonal mirror motor control circuit 93 on the one hand, and drives the drum motor 23 for the photosensitive drum 21 described later via the drum motor drive circuit 94. When the polygonal mirror motor 30 and the drum motor 23 attain specific rotation speeds, a clock signal is input and the rotation speeds are maintained.

In order to prevent local wear of the photosensitive layer 22 of the photosensitive drum 21, the signal permitting emission by the laser diode 7 is not transmitted to the drawing control unit 6 when the clock signal is not active. Also connected to the microcomputer 91, although not shown in the drawing, are devices necessary for the operation of the laser beam printer P, and input device and output devices such as sensors and the like.

Figure 4:
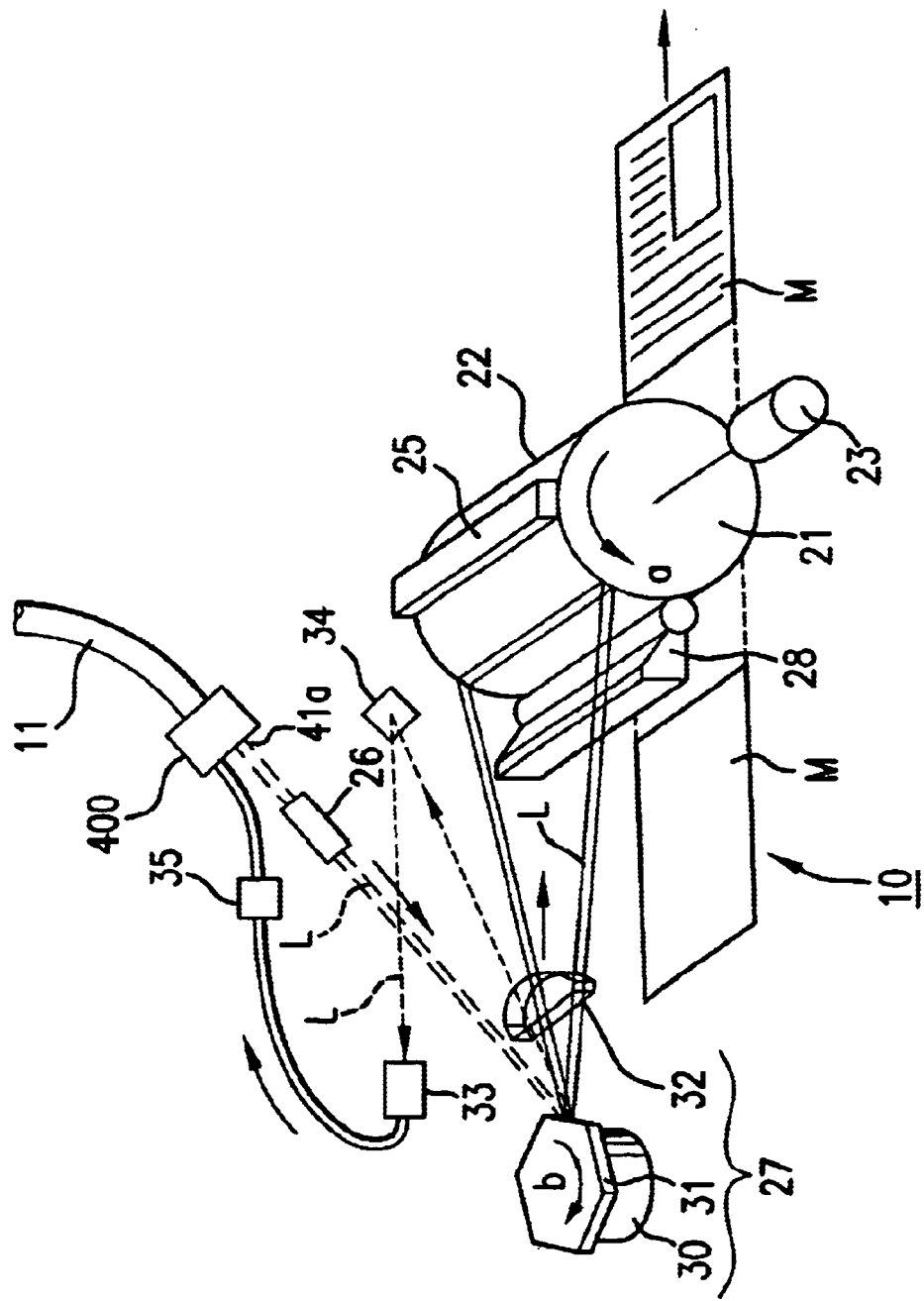
FIG. 4 is a perspective view showing the essence of the image forming unit 10 of the first embodiment.

FIG. 4 is a perspective view showing the essence of the image forming unit 10 of the first embodiment. The photosensitive drum 21 has on its surface a photosensitive layer 22, and is rotated in the arrow a direction in the drawing by the drum motor 23. A charger 25 is provided at the surface of the photosensitive drum 21, and uniformly charges the surface of the photosensitive layer 22 appearing before the sensor in conjunction with the rotation of the photosensitive drum 21. An optical signal L and combined light are emitted from the exit end by a combiner 400 provided at the end on the output side of the optical fiber 11.

The emitted optical signal L passes through a condensing lens 26, and is deflected by a optical scanning means 27, and this optical signal L irradiates (scans) the photosensitive layer 22 along the axial direction of the photosensitive drum 21. The charged state of the surface of the photosensitive layer 22 is changed by the irradiation of the laser light, and a latent image is formed. A developing device 28 is provided downstream of the position irradiated by laser light on the photosensitive drum 21, and a visible image is developed by toner adhered to the formed latent image.

The optical scanning means 27 is rotated, for example, in the arrow b direction, at constant high speed by the polygonal mirror motor 30, and the output optical signal is reflected by each surface of a polygonal mirror 31, and scans the photosensitive layer 22 at equal speed via an fθ lens 32. Part of the reflected light from the polygonal mirror 31 is reflected by an SOS mirror 34, and impinges the detection position 33 of the horizontal synchronizing signal. The detection position 33 couples the light reflected by the SOS mirror to the wavelength converter 35 and is subjected to wavelength conversion by the wavelength converter 35. The converted light then impinges the combiner 400. The light output from the combiner 400 is directed through the optical fiber 11 to the video controller 3.

Figure 5:
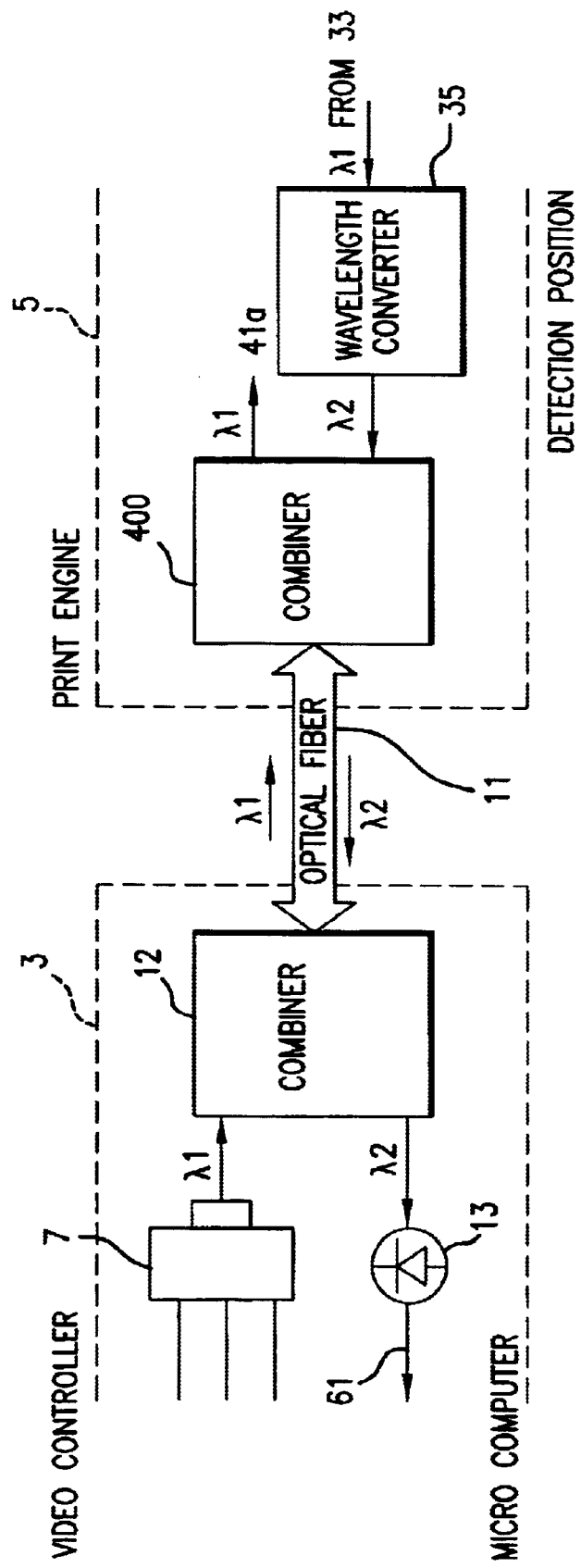
FIG. 5 briefly shows the basic structure of bi-directional communication of light in the first embodiment.

FIG. 5 briefly shows the basic structure of bi-directional communication of light. The output of the laser diode 7 oscillating the optical signal and emission light used to obtain the light of wavelength $\lambda 1$ passes through the combiner 12, and is transmitted through optical fiber 11 to the print engine 5 side. The transmitted light passes through the combiner 400 on the printer engine 5 side and is emitted from the exit end 41a. The light emitted from the exit end 41a forms a latent image on the photosensitive layer 22 as previously described.

The light of wavelength $\lambda 1$ reflected to the detection position 33 is converted to a wavelength $\lambda 2$ by a wavelength converter 35, passes through the combiner 400, and is transmitted through the optical fiber 11 in the reverse direction to the video controller 3 side. The transmitted light of wavelength $\lambda 2$ passes through the combiner 12, is subjected to photoelectric conversion by the photosensor 13, and is input as an electrical signal (synchronizing signal) to the microcomputer 61. Based on this operation, the light of wavelength $\lambda 1$ used for image drawing is oscillated by the laser diode 7 so as to match the image timing on the print engine 5 side.

In this way, the raster signal (light) and optical signal used for the horizontal synchronizing signal are transmitted from the video controller 3 side to the print engine 5 side over the same optical fiber 11, and the synchronizing signal is generated by the optical signal, which was reflected by polygon mirror 31 and then by SOS mirror 34 to the specific detection position 33 from the print engine 5 side, and the synchronizing signal (light of wavelength $\lambda 2$) is transmitted in the reverse path over the optical fiber 11 to the video controller 3 side. By performing wavelength conversion at this time, part of the light of wavelength $\lambda 1$ from the video controller 3 side is reflected to the video controller 3 side as the synchronizing signal of wavelength $\lambda 2$, but since the wavelengths are different, these signals can be reliably separated.

Second Embodiment

Figure 6:
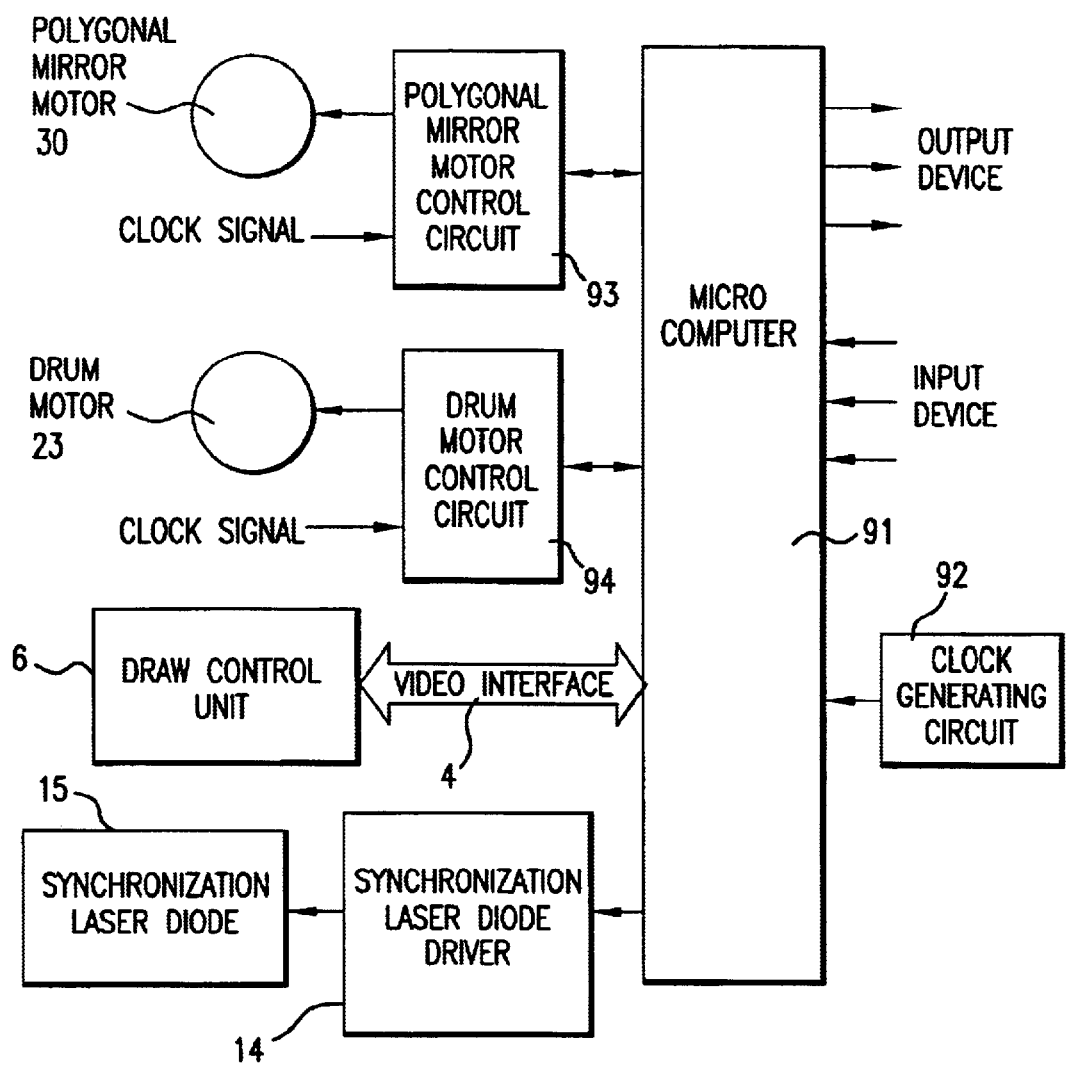
FIG. 6 is an example of a block diagram showing more details of the print engine control unit 9 of the second embodiment and part of the elements connected thereto.

FIGS. 1 and 2 are also common to the second embodiment. FIG. 6 is an example of a block diagram showing more details of the print engine control unit 9 of the second embodiment and the elements connected thereto. In the second embodiment, substantially similar parts or parts having identical function with parts of the first embodiment are represented with reference numbers identical to those of the first embodiment.

The print engine control unit 9 is provided with a microcomputer 91, and clock generating circuit 92 driving the microcomputer 91, and when the video controller 3 completes analysis of the image information and a print execution command is transmitted, the standby state of the print engine 5 is verified, and thereafter a signal permitting the emission operation of the laser diode 7 is transmitted to the video controller 3, and in this way the execution of the electrophotographic process is started.

Specifically, the microcomputer 91 drives the polygonal mirror motor 30 via the polygonal mirror motor control circuit 93 on the one hand, and drives the drum motor 23 for the photosensitive drum 21 via the drum motor drive circuit 94. When each motor (30, 23) attains a specific rotation speed, a clock signal is input and the rotation speed is maintained. In order to prevent local wear of the photosensitive layer 22 of the photosensitive drum 21, the signal permitting emission by the laser diode 7 is not transmitted to the drawing control unit 6 when the clock signal is not active, and also connected to the microcomputer 91 are devices necessary for the operation of the laser beam printer P, and input device and output devices such as sensors and the like similar to the first embodiment.

Although, in the first embodiment, the radiation light (of wavelength λ1) used to obtain a synchronizing signal is generated by the same laser diode 7 which generates the optical signal L, in the second embodiment, the light (of wavelength μ1) used to obtain the synchronizing signal is generated by a different laser diode, i.e., a synchronization laser diode 15.

Figure 7:
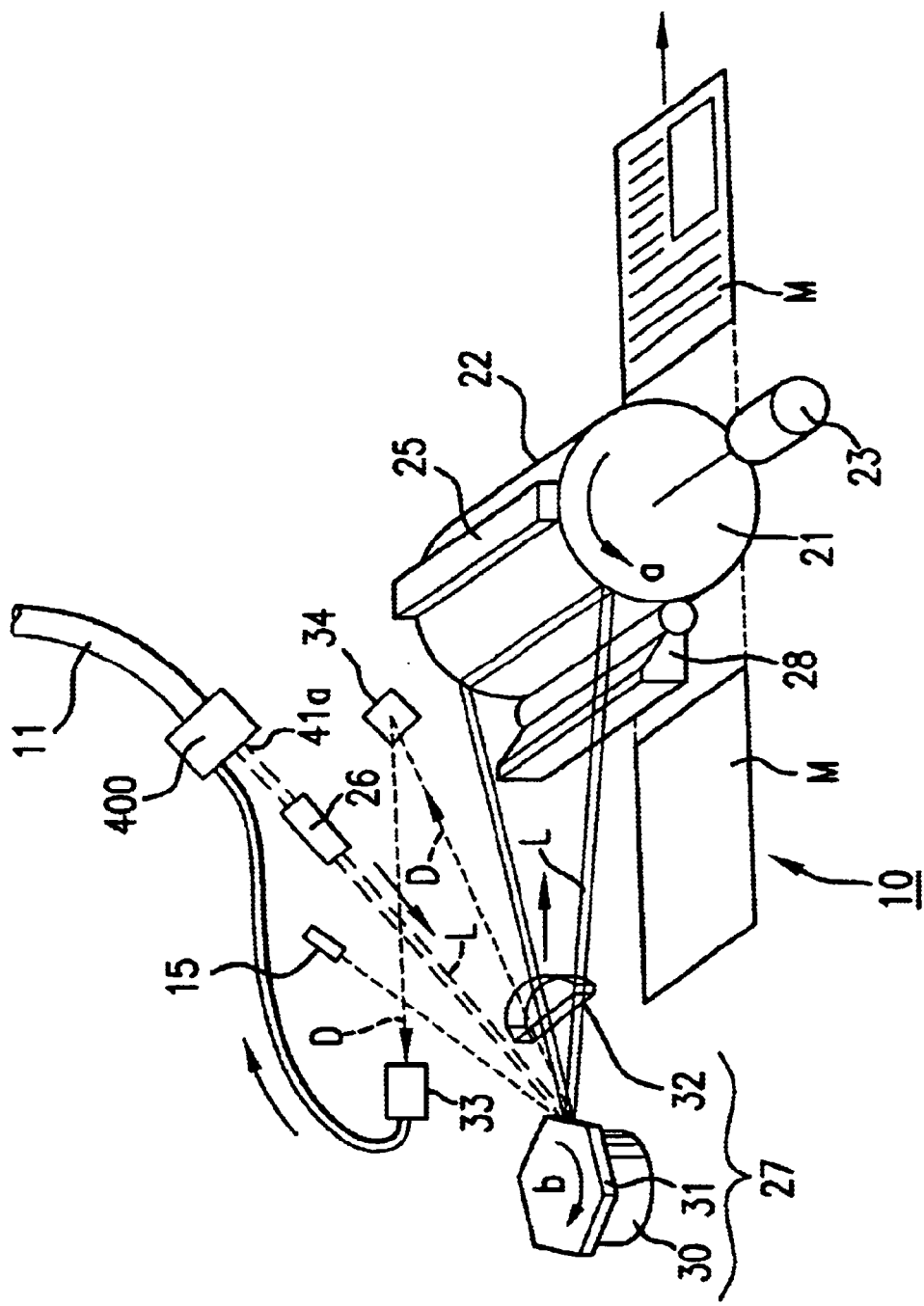
FIG. 7 is a perspective view showing the essence of the image forming unit 10 of the second embodiment.

FIG. 7 is a perspective view showing the essence of the image forming unit 10 of the second embodiment. Since the formation of the latent image and visible image on the photosensitive drum 21 is identical to that of the first embodiment (FIG. 4), it is not described, however, the second embodiment differs in that the signal transmitted through the optical fiber 11 to the print engine 5 side includes a light signal used to generate the synchronization signal. For this reason, a laser diode 15 different from the laser diode 7 for generating light, is provided facing the polygonal mirror 31 at a position nearly identical to the condensing lens 26.

Light emitted with a suitable timing from the synchronization laser diode 15 is reflected by the polygonal mirror 31, and is reflected by the SOS mirror 34 only when the polygonal mirror 31 is at a fixed rotational angle position, and reaches the detection position 33. A synchronizing signal is generated when the light reaches the detection position 33 and is coupled to the optical fiber 11.

Figure 8:
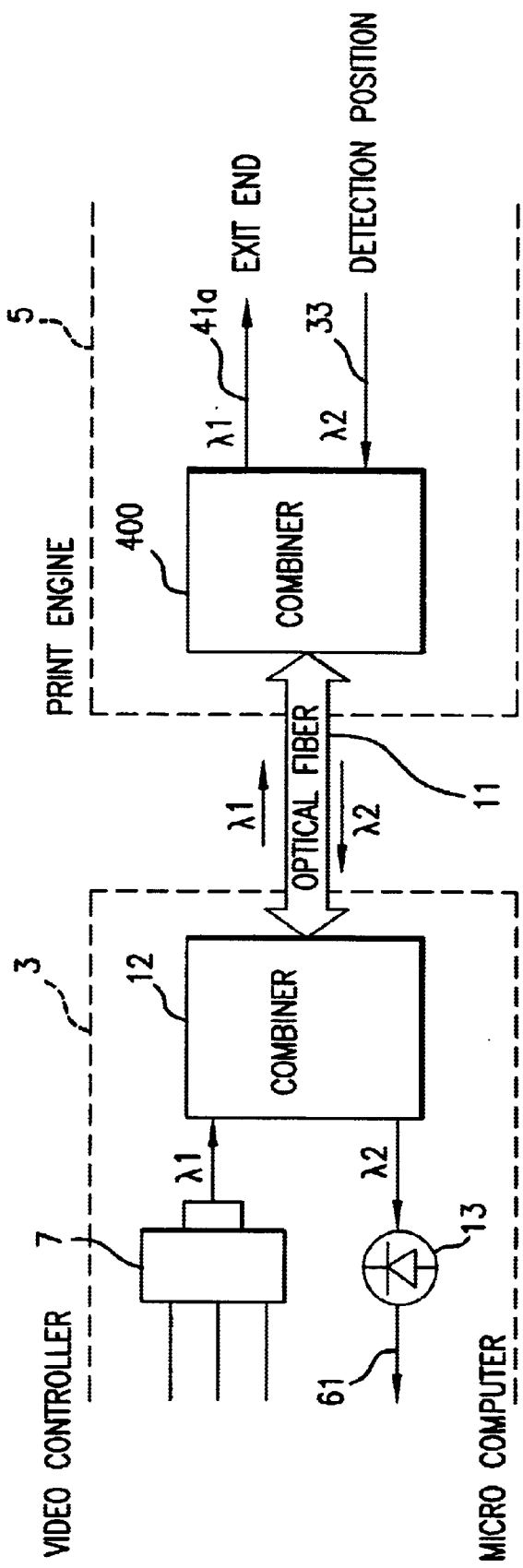
FIG. 8 briefly shows the basic structure of bi-directional communication of light in the second embodiment.

FIG. 8 briefly shows the basic structure of bi-directional communication of light in the second embodiment. The second embodiment is similar to the first embodiment in that the laser diode 7 only generates an image signal (raster signal), and this raster signal passes through the combiner 12, and is transmitted to the print engine 5 side over the optical fiber 11 and ultimately forms a latent image on the photosensitive layer 22, but differs in that the synchronizing signal (light) of wavelength λ2 is generated by synchronization laser diode 15.

Since the light emitted from the synchronization laser diode 15 has a wavelength λ2 which differs from the light of wavelength λ1 of the raster signal, the light from the detection position 33 is input directly to the combiner 400 without passing through the wavelength converter 35 as in the first embodiment, and the output from the combiner 400 is transmitted to the video controller 3 side over the optical fiber 11 similar to the first embodiment.

Figure 9:
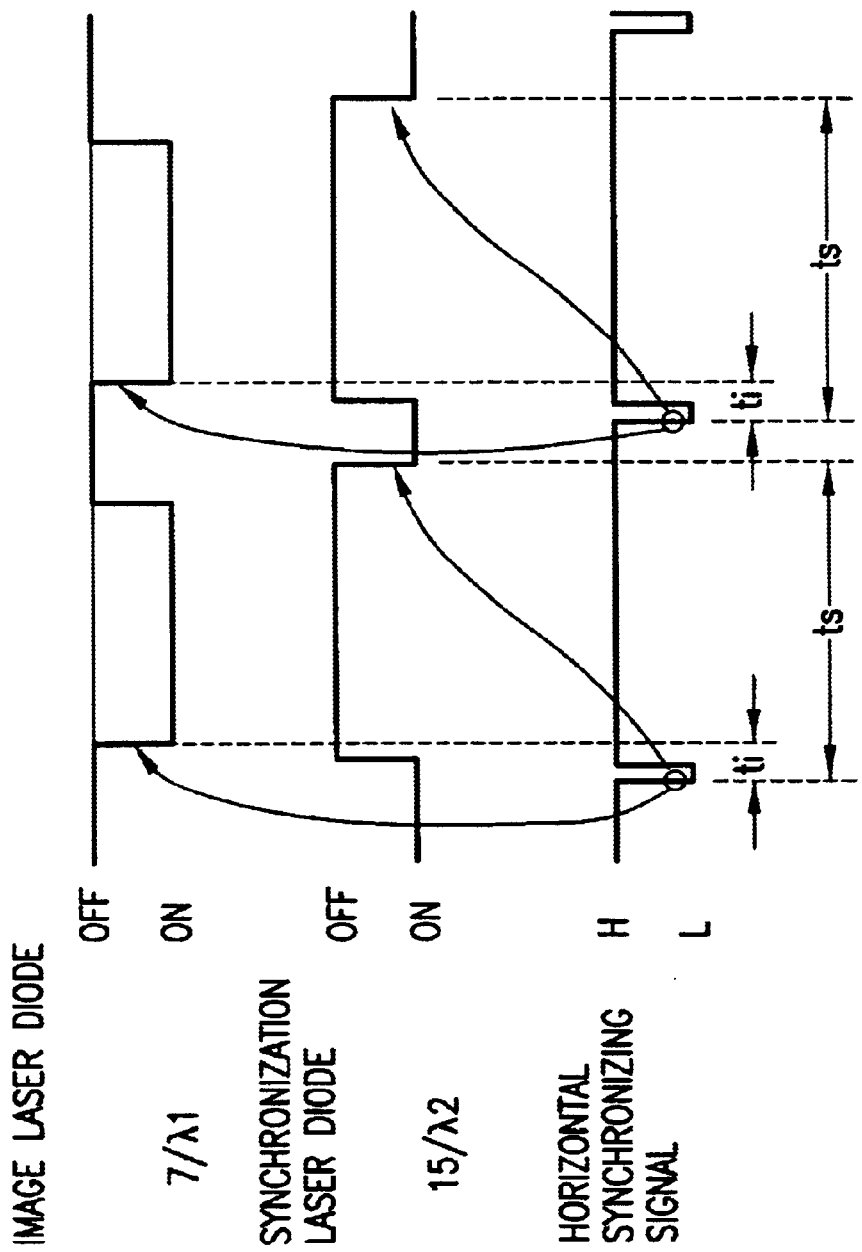
FIG. 9 is a timing chart showing the timing for actuating the synchronization laser diode 15 and actuating the image laser diode 7 for generating raster signals in the second embodiment.

FIG. 9 is a timing chart showing the timing of the actuation of the synchronization laser diode 15 and the actuation of the image laser diode 7 for generating raster signals in the second embodiment. The synchronization laser diode 15 continuously emits light until the horizontal synchronizing signal can be first detected (indicated by the circle in FIG. 9), and when the horizontal synchronizing signal is obtained, a timer (time ti) runs based on this signal, the image region is detected, and the image laser diode 7 emits light in accordance with an image signal. Furthermore, another timer (time ts) runs based on the horizontal synchronizing signal, to obtain a timing for emission by the synchronization laser diode 15 for obtaining the horizontal synchronizing signal.

Since the synchronizing signal is transmitted from the print engine 5 side to the video controller 3 side by the reverse path of the raster signal (light) transmitted from the video controller 3 side to the print engine 5 side over the same optical fiber 11, the signal line are reduced, external noise and emitted noise are reduced, the interior of the image forming apparatus is consolidated making handling and assembly easier.

The image forming apparatus of the present invention has the effect of not only transmitting signals including image information and synchronizing signal (irradiation light for obtaining a synchronizing signal) from the video controller to the print engine using a single optical fiber and without using a separate optical fiber, i.e., a special synchronization optical fiber, but also transmitting a synchronizing optical signal reflected by the SOS mirror on the print engine side simultaneously in the reverse direction to the video controller. A further effect is reduction of the number of lines (electrical signal lines and optical fiber lines), and external noise and emitted noise are reduced, and the interior of the image forming apparatus is consolidated making handling and assembly easier.

The embodiment disclosed herein is merely an example in terms of all aspects, and is not restrictive. The scope of the present invention is indicated by the claims, not by the explanation provided above, and all modifications equivalent to and within the scope of the claims are included.

What is claimed is:

1. An image forming apparatus comprising:
   an optical fiber;
   a transmission device connected to the optical fiber, the transmission device transmitting optical signals over the optical fiber;
   an optical scanning device connected to the optical fiber, the optical scanning device scanning an optical beam emitted from an exit end of the optical fiber;
   a synchronizing device connected to the optical fiber, the synchronizing device detecting the optical beam in a detection area, transmitting the detected optical beam over the optical fiber, and generating a synchronizing signal in response to the detected optical beam.

2. The image forming apparatus according to claim 1, further comprising a wavelength converting device converting a wavelength of the detected optical beam.

3. The image forming apparatus according to claim 1, wherein bi-directional communication is established over the optical fiber between the transmission device and the optical scanning device.

4. The image forming apparatus according to claim 3, wherein the optical scanning device scans an object in an image area using the emitted optical beam.

5. The image forming apparatus according to claim 4, further comprising a reflecting device reflecting the optical beam from an area adjacent the image area, the reflected optical beam bong reflected to the detection area.

6. The image forming apparatus according to claim 5, wherein the reflecting device is a SOS mirror.

7. An image forming apparatus comprising:
   a transmission device sending optical signals over an optical fiber; and
   an optical scanning device scanning an object using an optical beam emitted from the optical fiber, detecting the optical beam at a detection position provided outside an image region, and synchronizing a main scan direction based on the detected beam;
   wherein the detected optical beam is subjected to a wavelength conversion by a wavelength converting device, and bi-directional communication is accomplished using the optical fiber transmitting the optical signals.

8. The image forming apparatus according to claim 7, further comprising a reflecting device reflecting the optical beam from an area adjacent to the image region to the detection position.

9. The image forming apparatus according to claim 8, wherein the reflecting device is a SOS mirror.

10. An image forming apparatus comprising:

a transmission device sending optical signals over an optical fiber;

a synchronizing optical output device emitting a synchronizing optical output, wherein a synchronizing wavelength of the synchronizing optical output is different from a signal wavelength of the optical signals transmitted by the transmission device; and an optical scanning device scanning an object using an optical beam emitted from the optical fiber, detecting the optical beam at a detection position outside an image region, detecting the synchronizing optical output, and synchronizing a main scan direction based on the detected synchronizing optical output;

wherein bi-directional communication is accomplished over the optical fiber transmitting the optical signals by the transmission device and the optical scanning device.

11. The image forming apparatus according to claim 10, further comprising a reflecting device reflecting the optical beam at the detection position, the reflected optical beam being reflected towards the optical scanning device.

12. The image forming apparatus according to claim 11, wherein the reflecting device is a SOS mirror.

* * * * *